United States Patent
Beliakoff

[11] Patent Number: 6,000,821
[45] Date of Patent: Dec. 14, 1999

[54] ILLUMINATED TRUCK BED LINER

[76] Inventor: Paul M. Beliakoff, 9060 Otto St., Downey, Calif. 90240

[21] Appl. No.: 09/065,147

[22] Filed: Apr. 23, 1998

[51] Int. Cl.⁶ ....................................................... B60Q 1/00

[52] U.S. Cl. ............................ 362/485; 362/496; 362/484; 362/154; 362/156; 296/39.2

[58] Field of Search ................................... 362/489, 485, 362/496, 484, 154, 156; 296/39.2

[56] References Cited

U.S. PATENT DOCUMENTS

| | | | |
|---|---|---|---|
| 5,495,400 | 2/1996 | Currie | 326/32 |
| 5,636,883 | 6/1997 | Johns | 296/39.2 |
| 5,795,051 | 8/1998 | Galaniski | 362/80 |

Primary Examiner—Sandra O'Shea
Assistant Examiner—John A. Ward

[57] ABSTRACT

A truck bed is provided including a truck having a bed with a peripheral side wall which defines an open top and upper peripheral edge. At least one light assembly is mounted on the side wall for illuminating the bed of the truck.

7 Claims, 2 Drawing Sheets

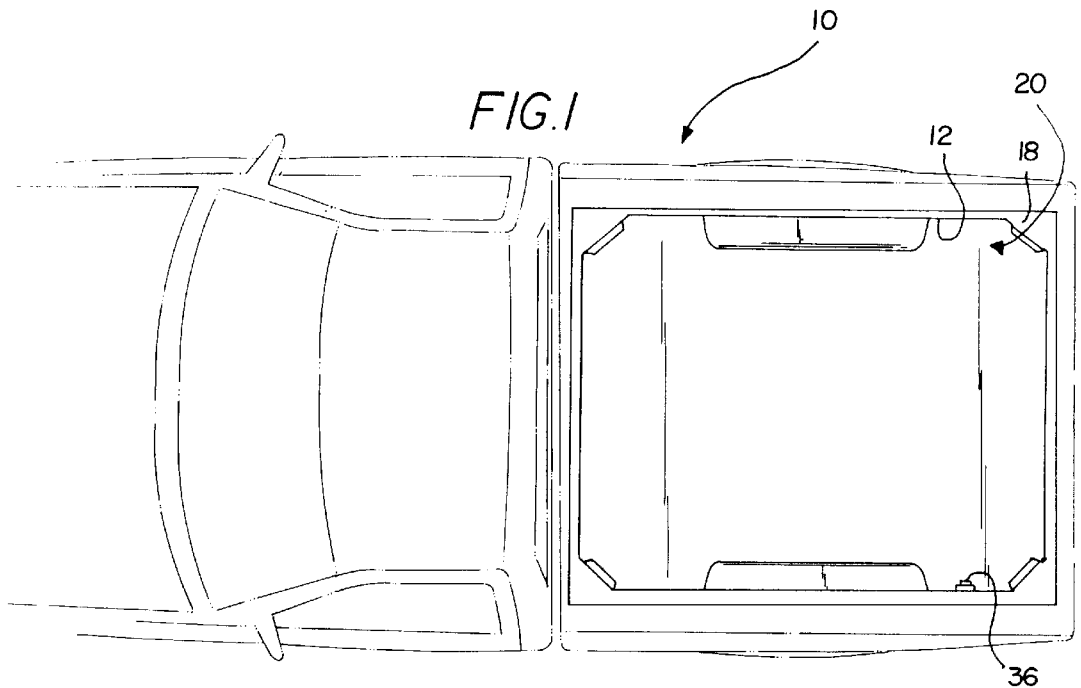
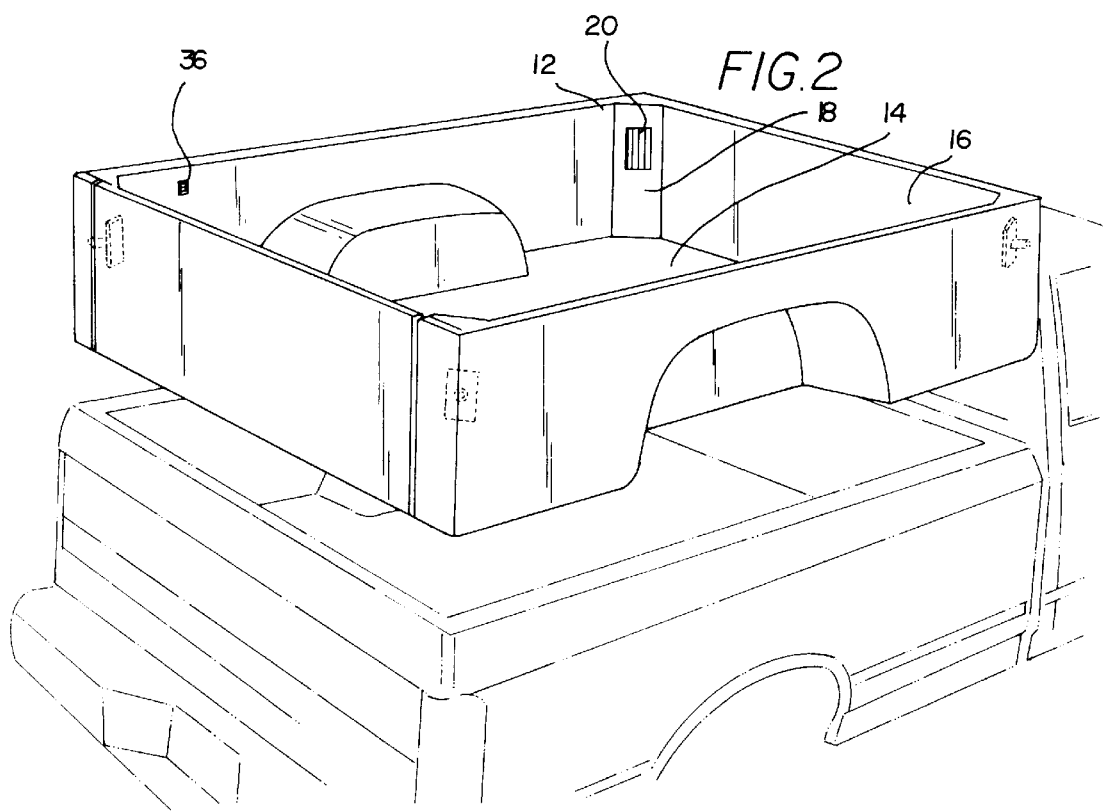

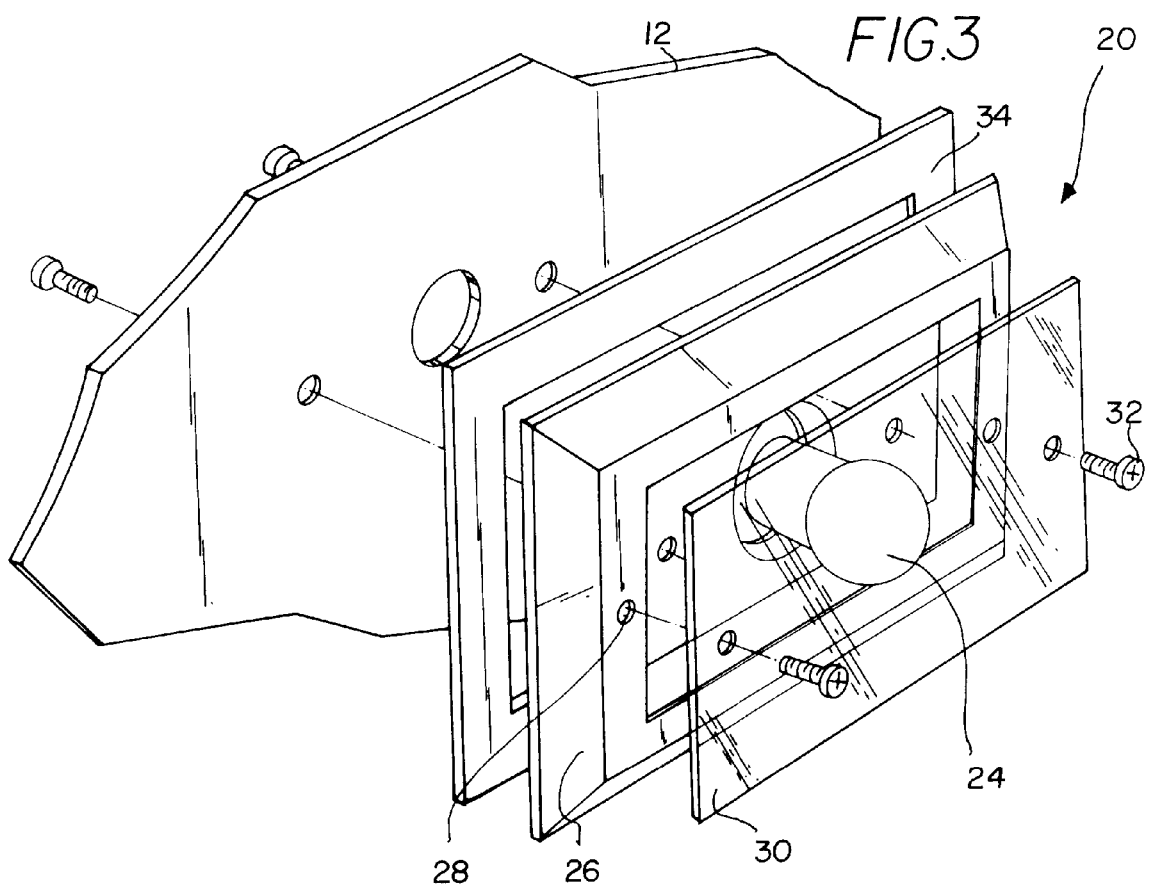

ILLUMINATED TRUCK BED LINER

BACKGROUND OF THE INVENTION

1. Field of the Invention

The present invention relates to truck bed liners and more particularly pertains to a new illuminated truck bed liner for illuminating a truck bed.

2. Description of the Prior Art

The use of truck bed liners is known in the prior art. More specifically, truck bed liners heretofore devised and utilized are known to consist basically of familiar, expected and obvious structural configurations, notwithstanding the myriad of designs encompassed by the crowded prior art which have been developed for the fulfillment of countless objectives and requirements.

Known prior art truck bed liners include U.S. Pat. Des. 345,431; U.S. Pat. No. 5,032,957; U.S. Pat. No. 3,947,677; U.S. Pat. No. 4,554,618; U.S. Pat. No. 4,979,083; and U.S. Pat. No. 4,872,099.

In these respects, the illuminated truck bed liner according to the present invention substantially departs from the conventional concepts and designs of the prior art, and in so doing provides an apparatus primarily developed for the purpose of illuminating a truck bed.

SUMMARY OF THE INVENTION

In view of the foregoing disadvantages inherent in the known types of truck bed liners now present in the prior art, the present invention provides a new illuminated truck bed liner construction wherein the same can be utilized for illuminating a truck bed.

The general purpose of the present invention, which will be described subsequently in greater detail, is to provide a new illuminated truck bed liner apparatus and method which has many of the advantages of the truck bed liners mentioned heretofore and many novel features that result in a new illuminated truck bed liner which is not anticipated, rendered obvious, suggested, or even implied by any of the prior art truck bed liners, either alone or in any combination thereof.

To attain this, the present invention generally comprises a liner having a planar, generally rectangular bottom face and a rectangular peripheral side wall. Such side wall is integrally coupled to a periphery of the bottom face and extends upwardly therefrom. As such, the liner defines an interior space and an open top with an interior space. The liner further includes vertically oriented blocks integrally coupled to an interior surface of the side wall in each of four corners thereof. These blocks extend along an entire height of the side wall. Note FIG. 2. Further, each block has a constant, uniform triangular horizontal cross-section along an entire height thereof. See FIG. 2. Each corner has a diagonal face with a large circular aperture formed therein at a central extent thereof. As shown in FIG. 3, the large circular aperture is flanked by a pair of small circular apertures. As shown in the figures, each diagonal face of the side wall of the liner has a light assembly mounted thereon. Such light assemblies each include a light bulb mounted within the large circular aperture of the diagonal face. Further, a rectangular frame is mounted on the diagonal face around the light bulb. The rectangular frame further has an inner periphery which is lined with a recess. A pair of bores are formed in opposite sides of the recess. FIG. 3 shows the light assembly including a planar rectangular transparent window. The window has a pair of bores formed therein adjacent to opposed side edges of a periphery thereof. The window is inserted within the recess of the frame with the bores thereof being in alignment with those of the frame. As such, both the frame and window may be mounted over the bulb via a pair of screws. For affording a hermetically sealed compartment in which the light bulb may reside, a rectangular bushing is situated between the frame and the side wall. Finally, an actuation switch is connected between a power source and the lights of each of the light assemblies for selectively illuminating the same.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new illuminated truck bed liner apparatus and method which has many of the advantages of the truck bed liners mentioned heretofore and many novel features that result in a new illuminated truck bed liner which is not anticipated, rendered obvious, suggested, or even implied by any of the prior art truck bed liners, either alone or in any combination thereof.

It is another object of the present invention to provide a new illuminated truck bed liner which may be easily and efficiently manufactured and marketed.

It is a further object of the present invention to provide a new illuminated truck bed liner which is of a durable and reliable construction.

An even further object of the present invention is to provide a new illuminated truck bed liner which is susceptible of a low cost of manufacture with regard to both materials and labor, and which accordingly is then susceptible of low prices of sale to the consuming public, thereby making such illuminated truck bed liner economically available to the buying public.

Still yet another object of the present invention is to provide a new illuminated truck bed liner which provides in the apparatuses and methods of the prior art some of the advantages thereof, while simultaneously overcoming some of the disadvantages normally associated therewith.

Still another object of the present invention is to provide a new illuminated truck bed liner for illuminating a truck bed.

Even still another object of the present invention is to provide a new illuminated truck bed liner that includes a peripheral side wall which defines an open top and upper peripheral edge. At least one light assembly is mounted on the side wall for illuminating the bed of the truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to, the following detailed description thereof. Such description makes reference to the annexed drawings wherein:

FIG. 1 is a top view of a new illuminated truck bed liner according to the present invention.

FIG. 2 is an exploded perspective view of the present invention.

FIG. 3 is an detailed, exploded perspective view of one of the light assemblies of the present invention.

DESCRIPTION OF THE PREFERRED EMBODIMENT

With reference now to the drawings, and in particular to FIGS. 1 through 3 thereof, a new illuminated truck bed liner embodying the principles and concepts of the present invention and generally designated by the reference numeral 10 will be described.

The present invention, designated as numeral 10, includes a liner 12 having a planar, generally rectangular bottom face 14 and a rectangular peripheral side wall 16. Such side wall is integrally coupled to a periphery of the bottom face and extends upwardly therefrom. As such, the liner defines an interior space and an open top with an interior space. As an option, the bottom face may be excluded.

The liner further includes vertically oriented blocks 18 integrally coupled to an interior surface of the side wall in each of four corners thereof. These blocks extend along an entire height of the side wall. Note FIG. 2. Further, each block has a constant, uniform triangular horizontal cross-section along an entire height thereof. See FIG. 2. Each corner thus has a diagonal face with a large circular aperture formed therein at a central extent thereof. As shown in FIG. 3, each large circular aperture is flanked by a pair of small circular apertures.

As shown in the Figures, each diagonal face of the side wall of the liner has a light assembly 20 mounted thereon. Such light assemblies each include a light bulb 24 mounted within the large circular aperture of the diagonal face. The light bulb is preferably situated about an axis which intersects a center of the truck bed. Further, a rectangular chrome frame 26 is mounted on the diagonal face around the light bulb. The rectangular frame further has an inner periphery which is lined with a recess. A pair of bores 28 are formed in opposite sides of the recess.

FIG. 3 shows the light assembly including a planar rectangular transparent window 30. The window has a pair of bores formed therein adjacent to opposed side edges of a periphery thereof. The window is inserted within the recess of the frame with the bores thereof being in alignment with those of the frame. As such, both the frame and window may be mounted over the bulb via a pair of screws 32. For affording a hermetically sealed compartment in which the light bulb may reside, a rectangular bushing 34 is situated between the frame and the side wall.

Finally, an actuation switch 36 is connected between a power source and the lights of each of the light assemblies for selectively illuminating the same. While the actuation switch may be situated within a cab of the truck, it is preferred that the same be mounted on an interior surface of the truck bed liner itself. It should be further noted that the light assemblies may be powered by a dedicated battery or in the alternative, with a battery of the vehicle. Another option for the present invention includes a hinged lid for selectively sealing the truck bed liner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An illuminated bed liner comprising, in combination:

a liner including a planar, generally rectangular bottom face and a rectangular peripheral side wall integrally coupled to a periphery of the bottom face and extending upwardly therefrom for defining an interior space and an open top with an interior space, the liner further including vertically oriented blocks integrally coupled to an interior surface of the side wall in each of four corners thereof and extending along an entire height of the side wall, each block having a constant, uniform triangular horizontal cross-section along an entire height thereof, wherein each corner has a diagonal face with a large circular aperture formed therein at a central extent thereof which is flanked by a pair of small circular apertures;

each diagonal face of the side wall of the liner having a light assembly mounted thereon, each light assembly including:

a light bulb mounted within the large circular aperture of the diagonal face, a rectangular frame mounted on the diagonal face around the light bulb, the rectangular frame having an inner periphery which is lined with a recess, wherein a pair of bores are formed in opposite sides of the recess, a planar rectangular transparent window having a pair of bores formed therein adjacent to opposed side edges of a periphery thereof, the window being inserted within the recess of the frame with the bores thereof being in alignment with those of the frame for allowing the mounting of both the frame and window over the bulb via a pair of screws, and a rectangular bushing situated between the frame and the side wall for affording a hermetically sealed compartment in which the light bulb resides; and an actuation switch connected between a power source and the lights of each of the light assemblies for selectively illuminating the same.

2. A truck bed comprising:

a truck having a bed with a peripheral side wall which defines an open top and upper peripheral edge; and at least one light assembly mounted on the side wall for illuminating the bed of the truck.

3. A truck bed as set forth in claim 2 wherein the light assembly includes a window mounted thereover.

4. A truck bed as set forth in claim 2 wherein the light assembly is mounted on a truck bed liner which is in turn mounted within the bed of the truck.

5. A truck bed as set forth in claim 2 wherein a plurality of light assemblies are included each mounted in one of four corners of the truck bed.

6. A truck bed as set forth in claim 5 wherein each bulb of the light assemblies is directed toward a center of the truck bed.

7. A truck bed as set forth in claim 2 wherein an actuation means is included for manually effecting the illumination of the light assembly when desired.

* * * * *